July 17, 1951  N. E. COLE  2,561,098
BODY STRUCTURE FOR VEHICLES
Filed Jan. 9, 1947  10 Sheets-Sheet 1
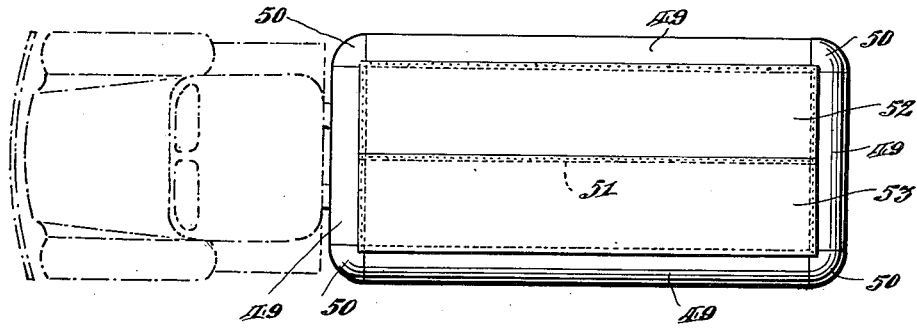
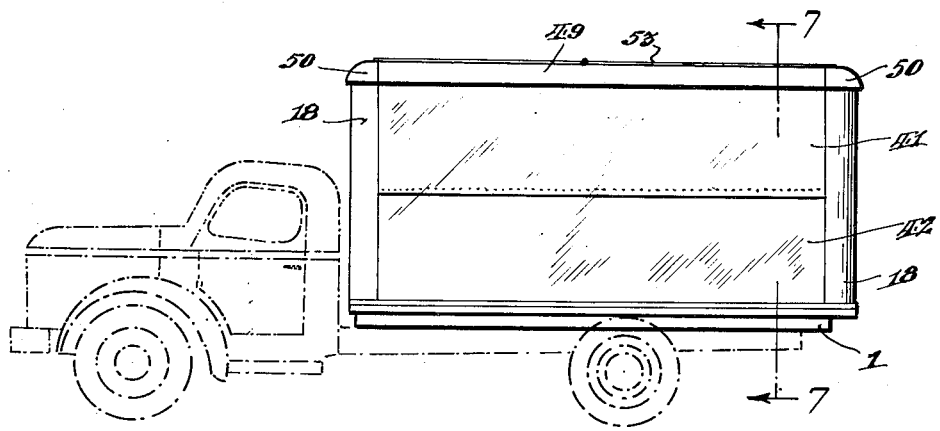
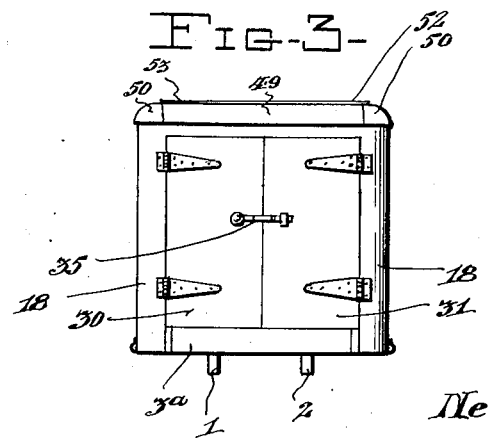
Inventor:
Nelson E. Cole,
by Alfred E. Ischinger
Attorney.

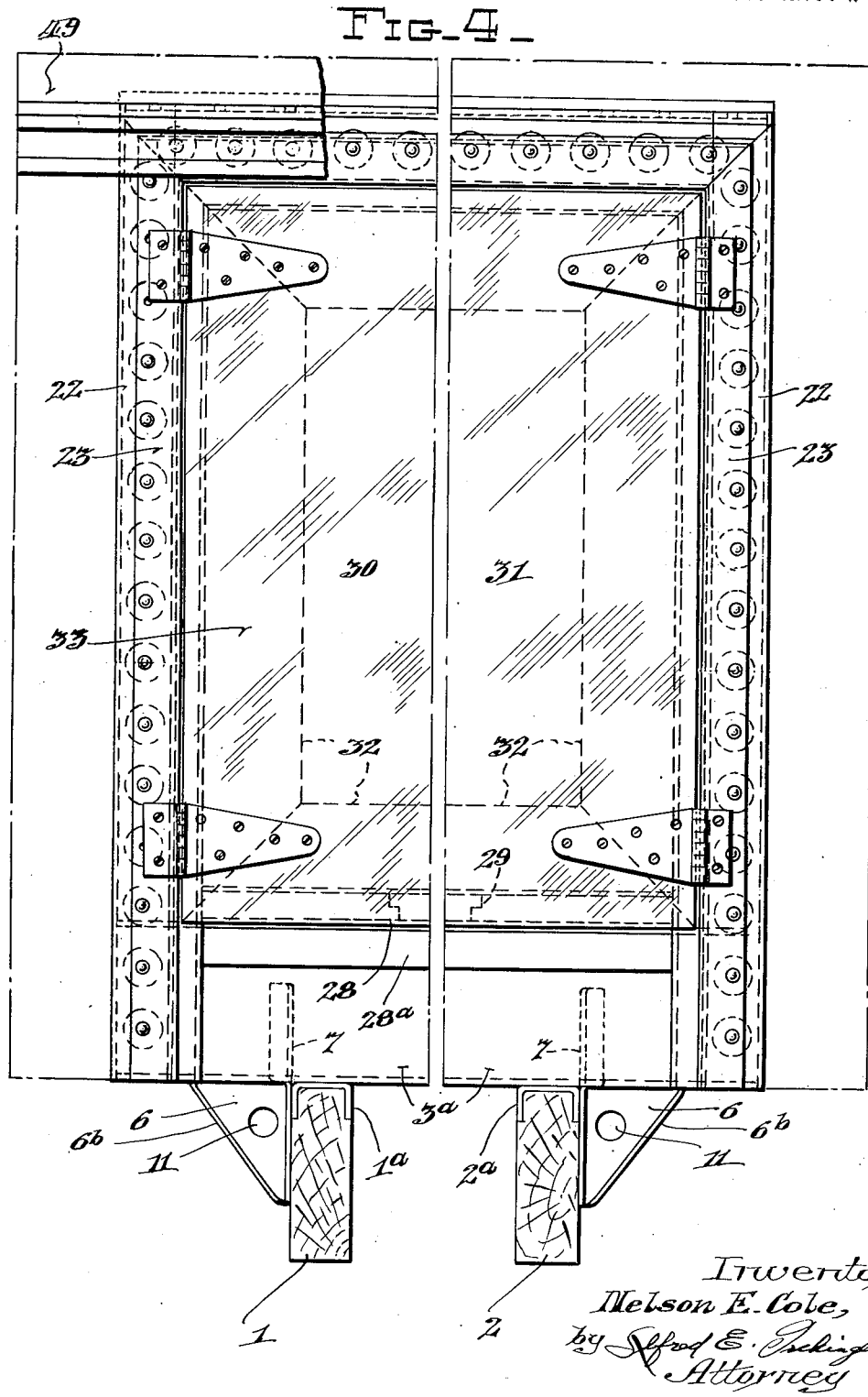

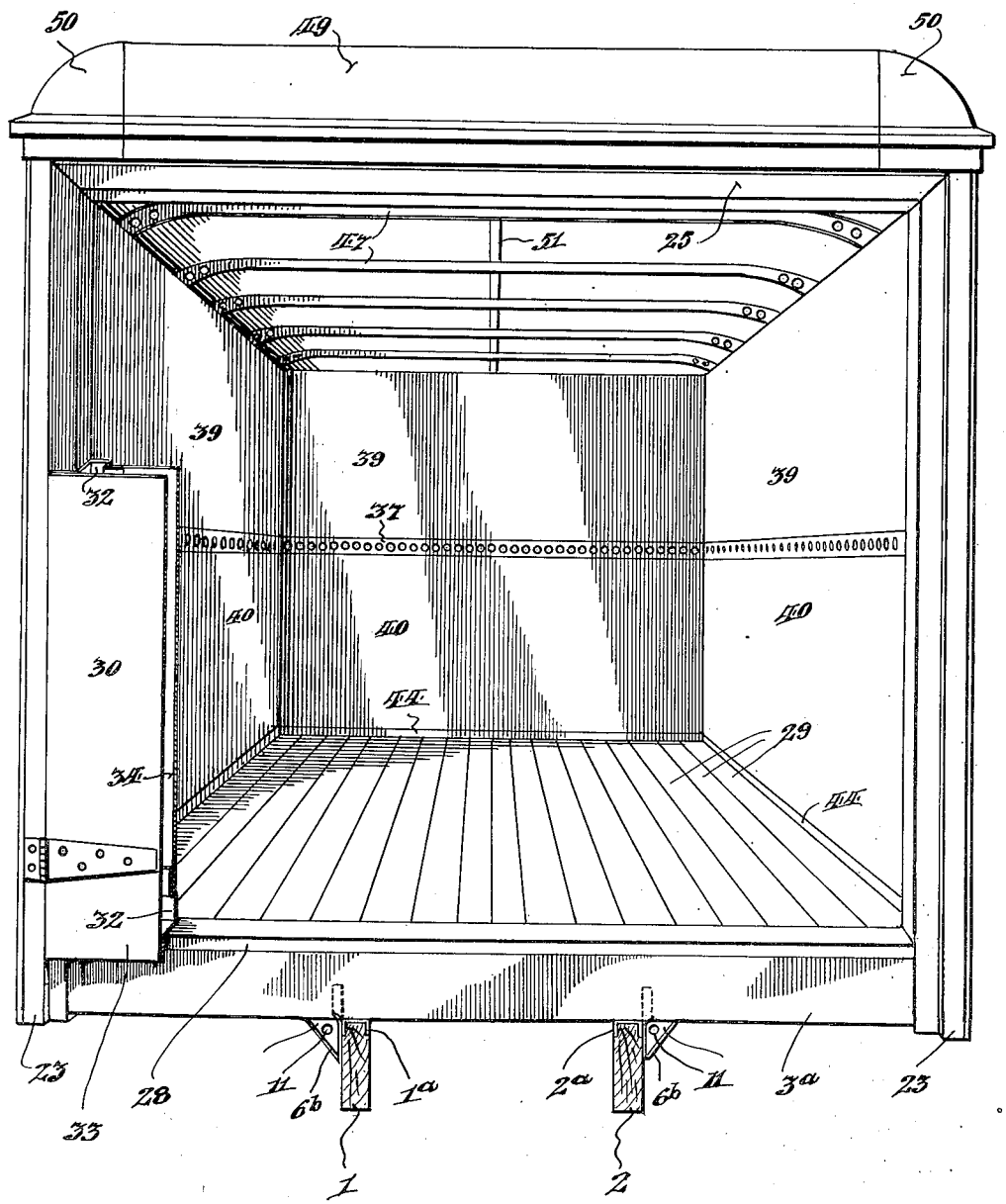

July 17, 1951  N. E. COLE  2,561,098
BODY STRUCTURE FOR VEHICLES
Filed Jan. 9, 1947  10 Sheets-Sheet 4
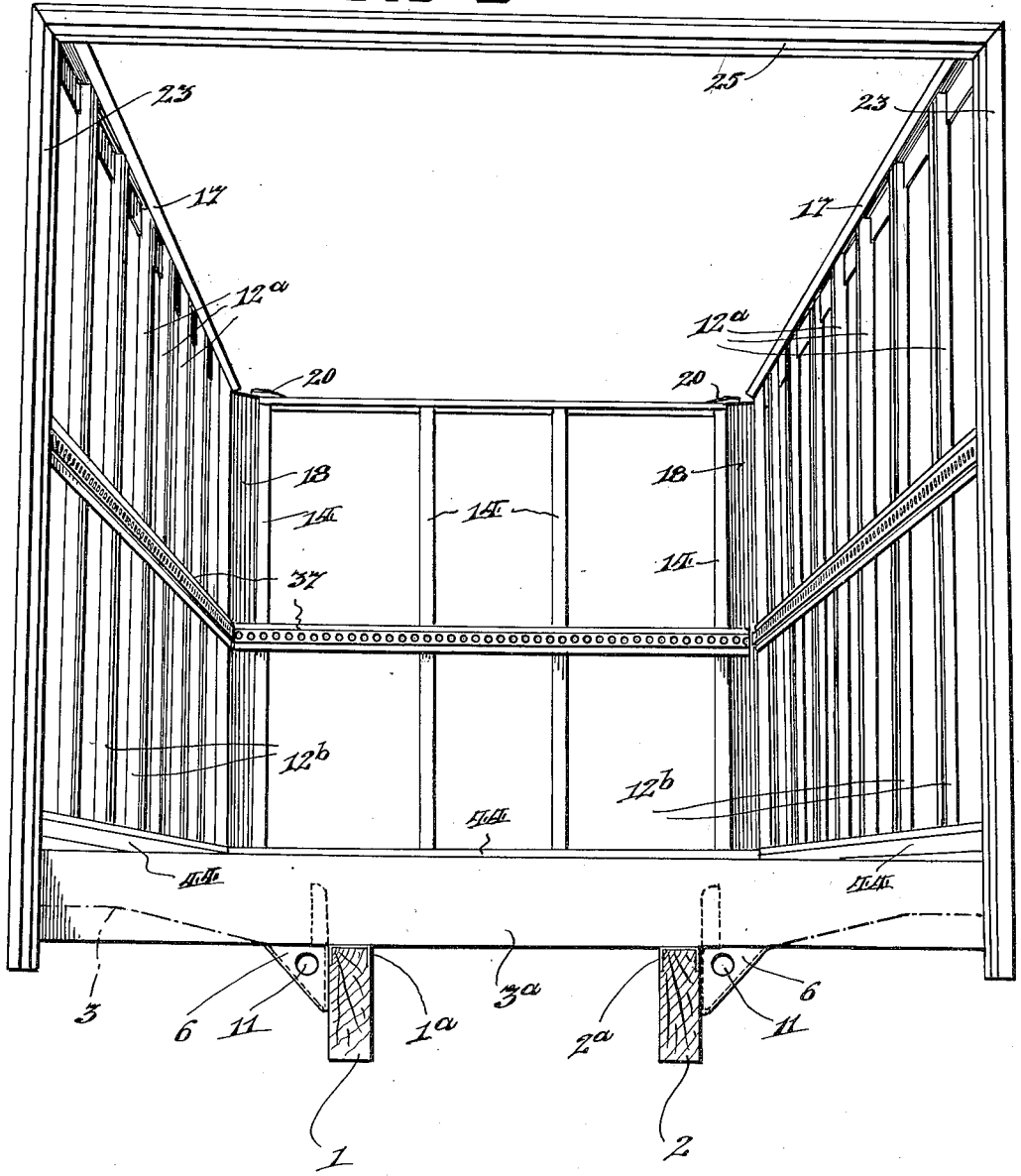
Fig-6-
Inventor:
Nelson E. Cole
by Alfred E. Ischinger
Attorney.

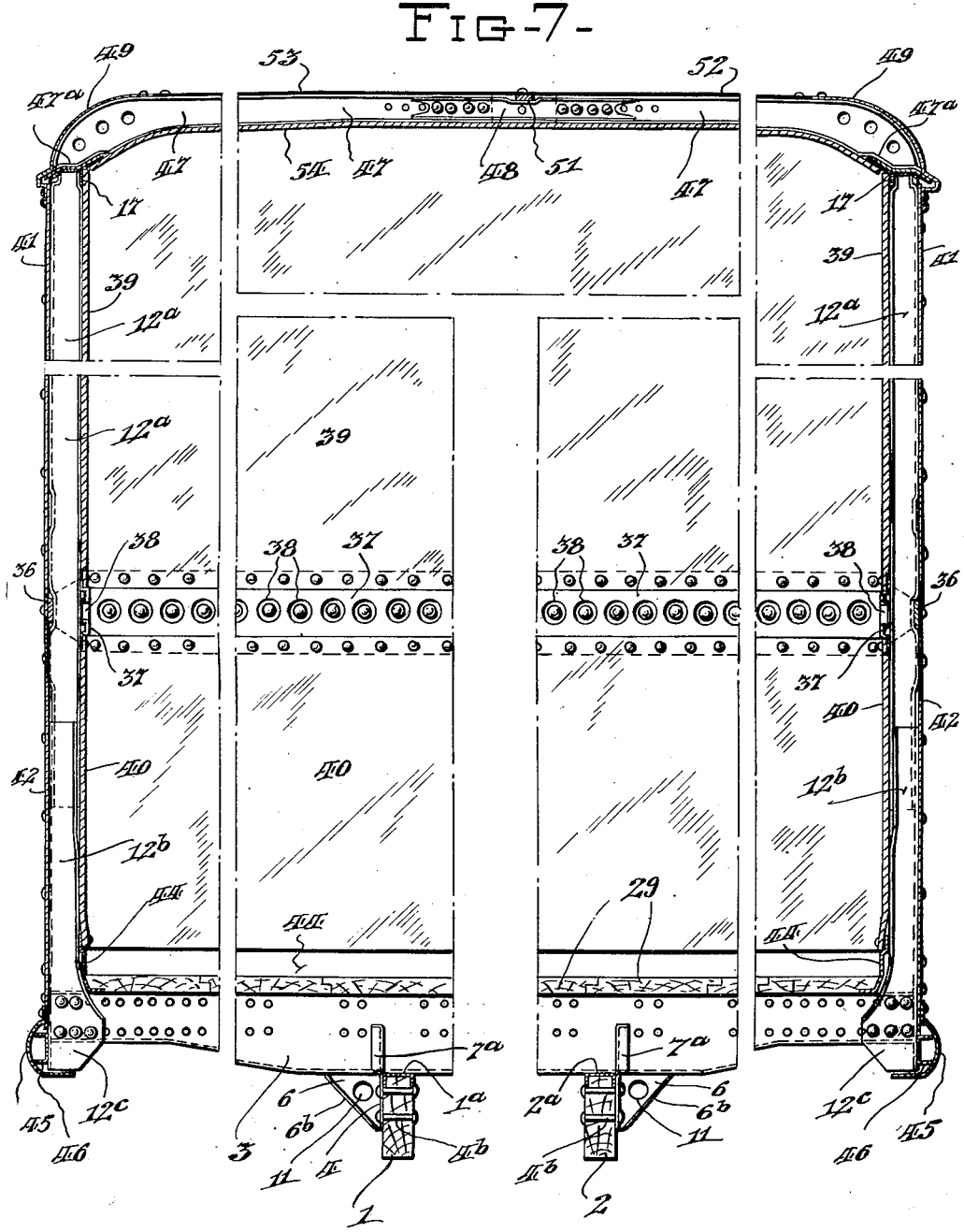

July 17, 1951 N. E. COLE 2,561,098
BODY STRUCTURE FOR VEHICLES
Filed Jan. 9, 1947 10 Sheets-Sheet 6
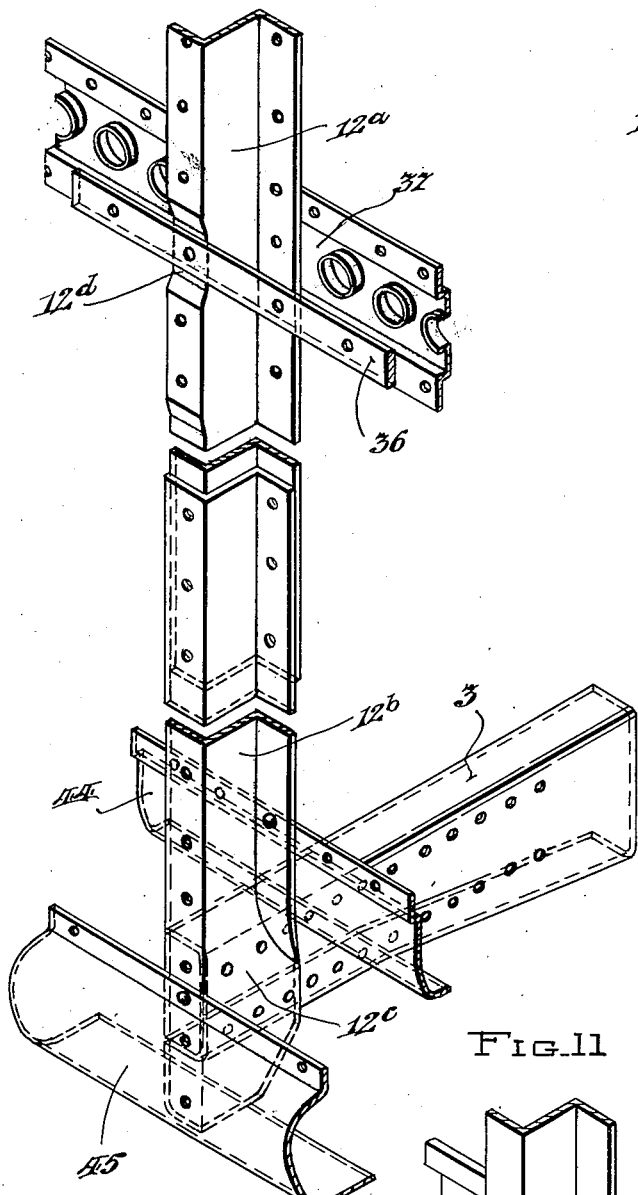
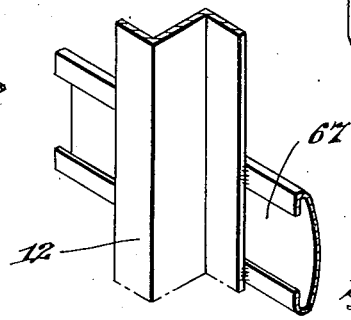
Inventor:
Nelson E. Cole,
by Alfred E. Ischinger,
Attorney.

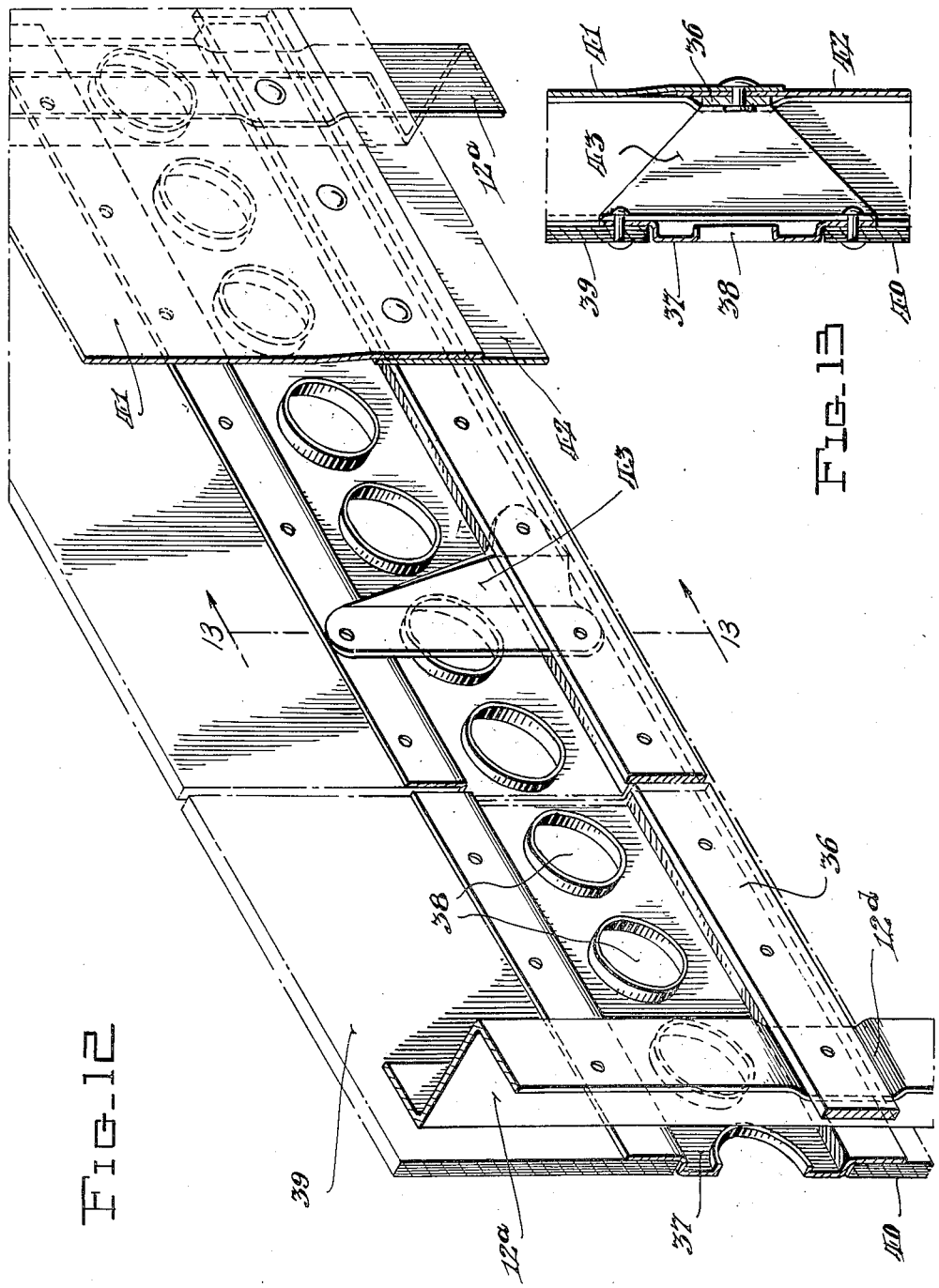

July 17, 1951   N. E. COLE   2,561,098
BODY STRUCTURE FOR VEHICLES
Filed Jan. 9, 1947   10 Sheets-Sheet 8
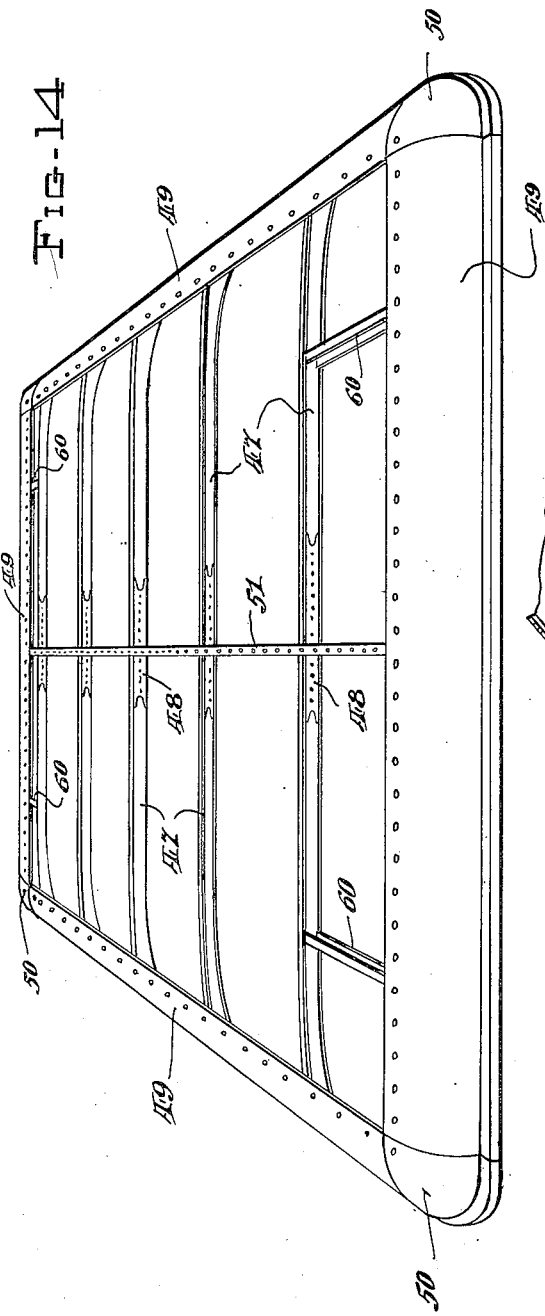
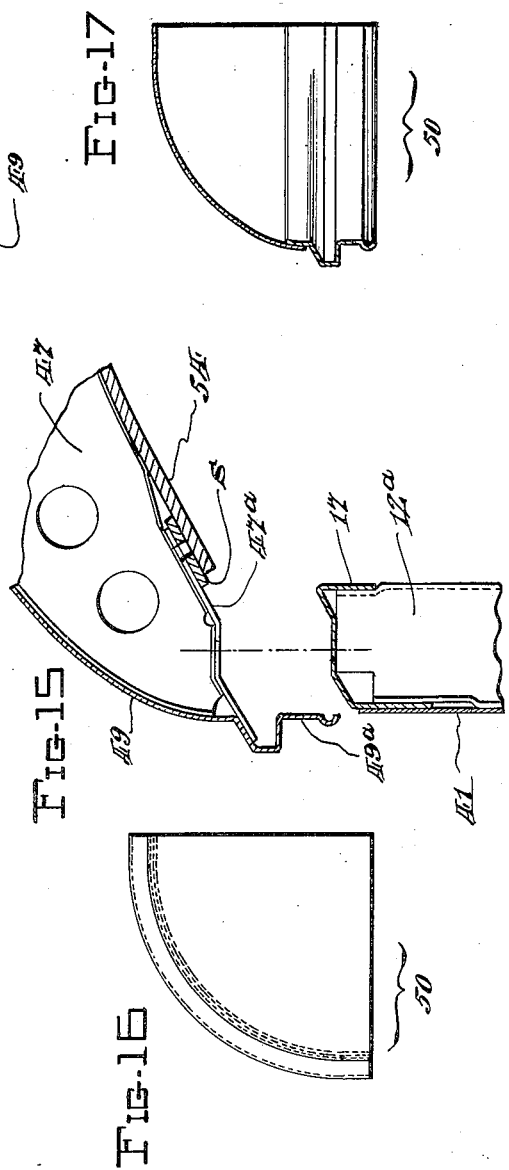
Inventor:-
Nelson E. Cole,
by Alfred E. Ischinger,
Attorney.

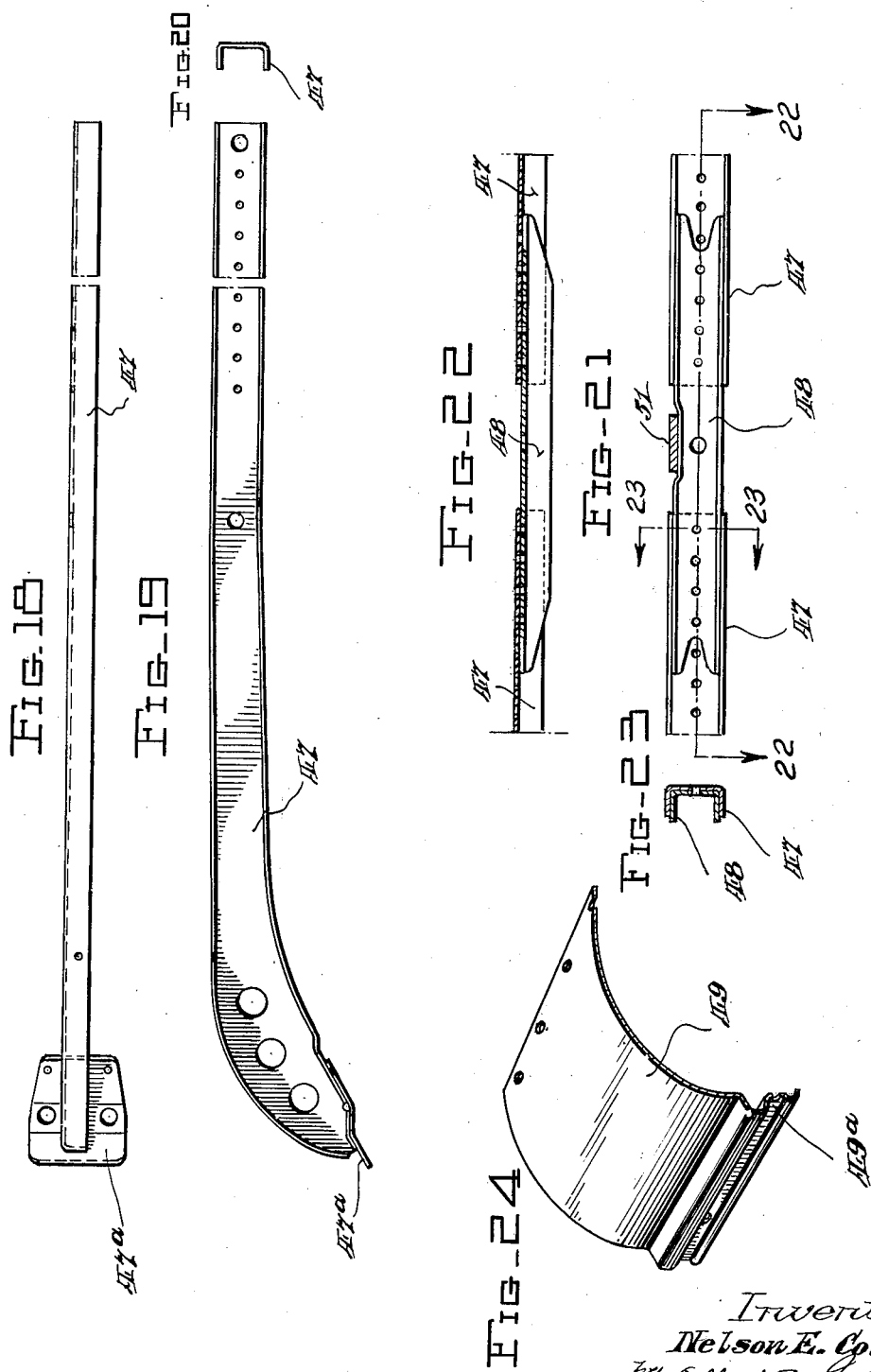

July 17, 1951    N. E. COLE    2,561,098
BODY STRUCTURE FOR VEHICLES
Filed Jan. 9, 1947    10 Sheets-Sheet 10
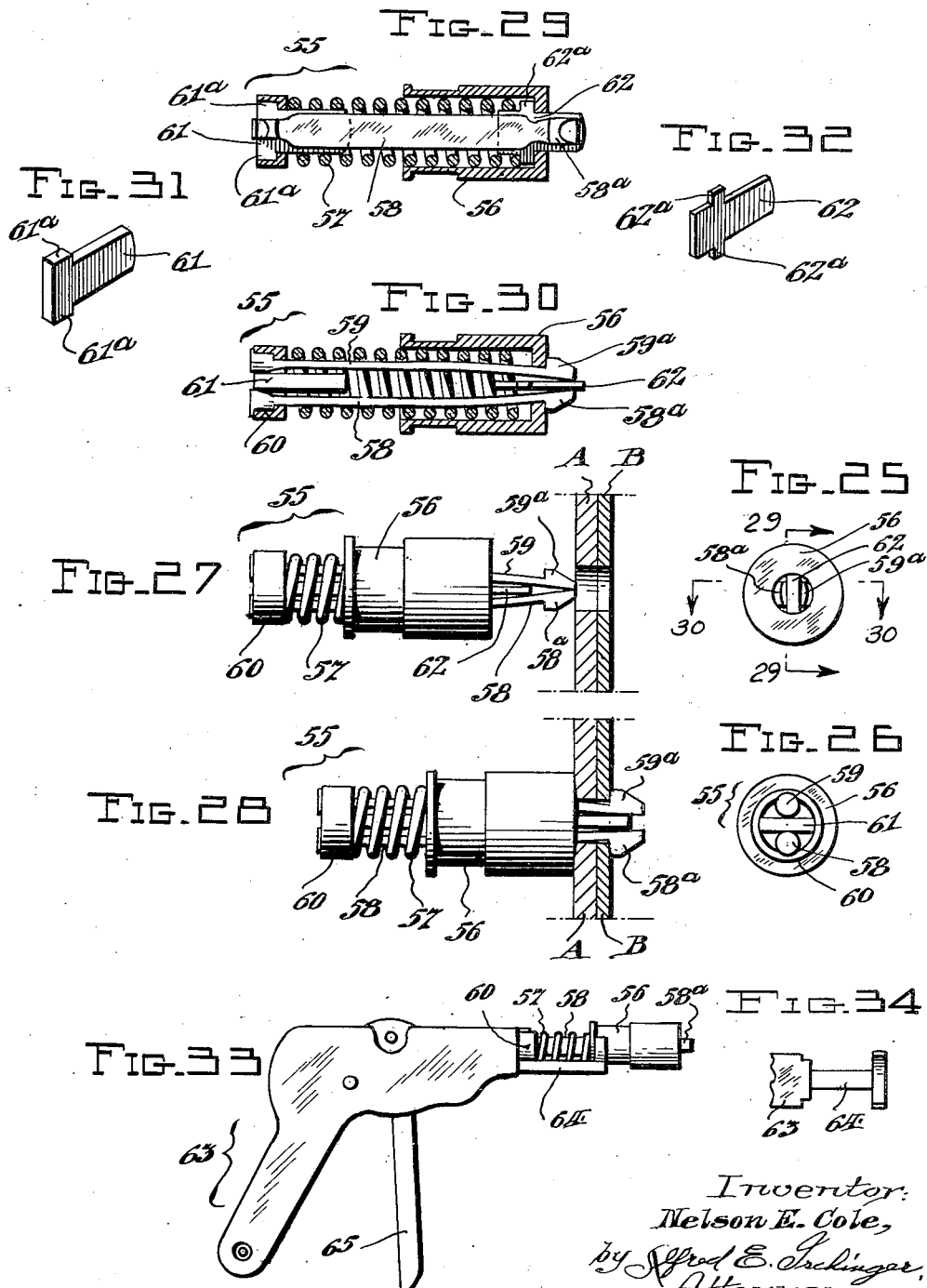

Patented July 17, 1951

2,561,098

UNITED STATES PATENT OFFICE 2,561,098

BODY STRUCTURE FOR VEHICLES

Nelson E. Cole, Reading, Pa., assignor to Parish Pressed Steel Co., Reading, Pa., a corporation of Delaware Application January 9, 1947, Serial No. 721,088

2 Claims. (Cl. 296—28)

This invention relates to body structure units for commercial vehicles, such as trucks, trailers, and the like, and to certain constituent or segmental body sections thereof, as well as to a method of producing the same.

The presently available prior art body structure units of the type indicated, were generally designed to meet certain conditions and commercial requirements prevailing at the time of their adoption. In recent years, new developments and techniques in the transportation and manufacturing fields have taken place which have considerably changed the former status of such body units. The users and manufacturers of such units have consequently been confronted with the problem of bringing about innovations in line with the more recent advancements and trends in construction materials, mass production methods and facilities, and the technological activities and practices in general. This situation not only involves the units as a whole, but the widely different constituent or segmental body sections thereof, each of which is subject to conditions and problems of its own. The said units comprise such main body sections as a base construction, wall construction, corner construction, door construction and roof construction, and such auxiliary sections as a rub rail construction, floor threshold construction, liner slats, etc. Segmental body sections of this type must be correlated and cooperatively combined in such manner as to enable the utilization of the structural and functional features of the unit and its constituent parts to best advantage. Trade approval and acceptance of the body units depends largely upon the extent to which they meet certain more important qualifications. For example, such qualifications as low material and manufacturing cost; light weight; maximum strength to resist the strains, stresses and shocks to which the units are ordinarily subjected when in actual use; the embodiment of universal body sections which are adapted to be quickly assembled and secured together; and the incorporation of features which will facilitate repairing the unit, permit its production in various standard sizes without entailing undue wastage of material and impart to the completed units a pleasing appearance.

One object of my invention is to provide a novel body unit for vehicles, such as trucks, trailers, and the like, which successfully solves the referred to problems, and which contains the indicated structural and functional features upon which trade approval and acceptance is predicated.

Another object is to provide such a unit which embodies certain novel structural and functional features of advantage over the similar units of the prior art.

A further object is to provide such a unit having certain novel universal body sections which are designed and adapted to be cooperatively associated with each other so as to impart to the unit desirable attributes and characteristics not heretofore present in the similar prior art units.

It is also an object to provide such a unit which consists of separate universal body sections that can be manufactured at a relatively low cost, quickly and easily combined in proper relationship by temporary fastening means, and then permanently secured together.

An additional object is to provide such a unit comprising certain unique constituent or segmental body sections which are adapted to be cooperatively combined in accordance with a novel assembly system that greatly facilitates the mass production of such units.

Another object is to provide such a unit which successfully attains the above noted and other desirable qualifications, and which can be produced in accordance with a new method.

Other objects are, the provision of such a unit which embodies and combines in novel cooperative relationship, various constituent or segmental body sections, such as a base construction, wall construction, roof construction, door construction, corner construction, rub rail construction and threshold construction; in which these and other sections are designed and arranged so as to maintain the weight of the unit at a minimum while imparting thereto maximum strength in a manner not heretofore achieved; which sections can be cooperatively assembled and secured together in a much quicker and easier manner than heretofore possible; and which sections otherwise introduce into the complete unit unique, desirable and important structural and functional features and characteristics in conformity with recent transportation and manufacturing advancements and practices.

With these and other objects in view, which will become more apparent from the following detailed description of the practical and illustrative embodiment of my novel vehicle body structure unit shown in the accompanying drawings, the invention comprises the novel elements, features of construction and arrangement of parts in cooperative relationship, as well as the new method, hereinafter more particularly defined by the appended claims.

In the accompanying drawings:

Figure 1 is a top plan view of one form of commercial vehicle body unit embodying my invention.

Fig. 2 is a side elevational view of the body unit shown in Fig. 1.

Fig. 3 is a rear end elevational view of the body unit shown in the preceding figures.

Fig. 4 is an enlarged, partial rear end elevational view of the body unit which discloses certain structural details.

Fig. 5 is a rear end elevational view of the body unit, with most of the door structure removed so as to disclose the general interior appearance of the unit.

Fig. 6 is a view similar to Fig. 5, but with the roof and the interior and exterior paneling removed, so as to disclose the general appearance of certain frame members of the unit when combined in properly assembled relationship.

Fig. 7 is an enlarged vertical cross-sectional view of the body unit, taken substantially as indicated by the arrows 7—7 on Fig. 2, with intermediate portions of the unit omitted in order to permit the disclosure of certain structural details on a larger scale.

Fig. 8 is a partial vertical detail perspective view of one of the wall posts of the body unit, and discloses sections of certain other frame members combined therewith so as to indicate the assembly arrangement of these parts.

Fig. 9 is a partial elevational view of one of the wall posts of the body unit, as it appears when seen from the outside of the unit.

Fig. 10 is a side elevational view of the post shown in Fig. 9.

Fig. 11 is a partial elevational detail perspective view of a sectional part of the post shown in Figs. 9 and 10, and discloses combined therewith a certain liner slat of the type adapted to be provided on the interior of the body unit, if desired.

Fig. 12 is an enlarged detail sectional perspective view of the inner and outer belt line construction, and shows certain other parts in their respective related locations.

Fig. 13 is a vertical detail sectional view, taken substantially as indicated by the arrows 13—13 on Fig. 12.

Fig. 14 is a top perspective view of one form of roof frame structure unit which can be provided in accordance with my invention.

Fig. 15 is an exploded vertical detail sectional view of the upper end of the side wall construction, and an adjacent roof structure part, of the body unit.

Fig. 16 is a top plan view of a curved corner roof cap member.

Fig. 17 is an elevational edge view of the curved corner roof cap member shown in Fig. 16.

Fig. 18 is a top plan view of one of the two similar segmental members which are adapted to be centrally joined to form a roof carline or girder.

Fig. 19 is a side elevational view of the carline member shown in Fig. 18.

Fig. 20 is an end elevational view of the carline member shown in Fig. 19.

Fig. 21 is a view which shows the inner ends of two of the oppositely arranged segmental carline members alignedly arranged and one form of means adapted to join them in lengthwise adjusted relationship.

Fig. 22 is a longitudinal cross-sectional view, taken substantially as indicated by the arrows 22—22 on Fig. 21.

Fig. 23 is a vertical cross-sectional view, taken as indicated by the arrows 23—23 on Fig. 21.

Fig. 24 is a detail sectional perspective view of a straight roof cap member.

Fig. 25 is a front view of a temporary fastener, or clamping element, of the type utilized to effect temporary connection of the frame members of the body unit.

Fig. 26 is a rear view of the temporary fastener shown in Fig. 25.

Fig. 27 is a side elevational view of the temporary fastener shown in Figs. 25 and 26, as it appears when its clamping end is in readiness to be inserted through the aligned apertures of two contactingly arranged frame members that are to be temporarily connected by the fastener.

Fig. 28 is a side elevational view similar to Fig. 27, but shows the fastener as it appears after its clamping end has been inserted through the aligned apertures of two contactingly arranged frame members, and how the clamping end of the fastener functions to maintain the frame members in connected relation.

Fig. 29 is a longitudinal sectional view of the temporary fastener shown in Fig. 25, taken as indicated by the arrows 29—29 on the latter.

Fig. 30 is a longitudinal sectional view of the temporary fastener shown in Fig. 25, taken as indicated by the arrows 30—30 on the latter.

Figs. 31 and 32 are detail perspective views of two different elements forming part of the temporary fastener shown in Figs. 25 to 30 inclusive.

Fig. 33 is a side elevational view of one type of tool adapted to be used to selectively position and operate the temporary fasteners, and Fig. 34 is a plan view of the front end of the tool illustrated in Fig. 33, the temporary fastener shown in Fig. 33 being omitted.

LIST OF DESCRIPTIVE SECTIONS

To facilitate an understanding of my invention, the detailed description thereof has been divided into sections which may be conveniently referred to for an explanation of the various phases or features of the invention. The following list provides the titles of all the descriptive sections in the order presented, identified by roman numerals:

| Title | Section |
|---|---|
| General remarks concerning the invention | I |
| The base frame structure | II |
| The wall post structure | III |
| The inner and outer belt line structure | IV |
| The base rail structure | V |
| The rub rail structure | VI |
| The roof structure | VII |
| The surface panel structure | VIII |
| The method of producing the vehicle body unit | IX |
| Concerning Modifications | X |

SECTION I

*General remarks concerning the invention*

The accompanying drawings disclose one practical and illustrative type of body unit for commercial vehicles, constructed in accordance with my invention. As the description of this unit proceeds, it will become apparent that the various practical and functional features of my invention can be adapted to, and incorporated in, other forms of such body units. It is to be understood, therefore, that the inventive subject matter as herein disclosed, has a wide range of application to commercial vehicle body units in general, and that my invention is consequently not intended to be confined, or limited to, the specific embodiment herein shown and described.

In the drawings and description, only those parts necessary to a complete understanding of my invention have been presented; further information concerning the construction, use and function of other elements, or details, not herein specifically noted, but which are well known and can be used in association with my invention, being available in publications entitled "Parish Universal Body Sections Catalog A" and "Parish Universal Body Sections Catalog B," published and distributed by the Parish Pressed Steel Co., of Reading, Pennsylvania, and similar publications distributed by other manufacturers of vehicle body units of the general type here involved.

In connection with the reading of the following descriptive sections, it will be helpful to keep in mind certain of the more important novel features or phases of the invention which are generally characteristic of the type body units for commercial vehicles in accordance with my invention. One such feature resides in the provision of various constituent frame or other members of the body unit, having portions or sections provided with a special arrangement of apertures or perforations. These members are designed so that the said perforated sections thereof can be brought into overlapping relationship with one another, thereby to effect registry of certain of the apertures, for receiving temporary fastening devices adapted to quickly and firmly hold or clamp the constituent members together for subsequent permanent connection. The parts which are designed to be assembled and temporarily united in this manner, are also adapted to be permanently secured together by welded, riveted, or other suitable joints, at, or adjacent to the points where the temporary fastening devices have been applied.

It will be noted that this feature of providing the constituent members of the body unit with a unique arrangement of apertures, in accordance with the order or system herein disclosed, not only makes it possible to effect quick and easy temporary as well as permanent connection of the members, but also makes it possible to effect selective adjustment of the length, width, or size, of certain constituent or segmental members, during the assembly procedure, with the result that certain of the members can be strengthened as required, others adjusted as to size, and the unit as a whole provided in different standard sizes or proportions, with a minimum of parts, and without deviating from the general assembly procedure. This construction feature also makes it possible to arrange such parts as the body wall posts in exact parallelism with respect to each other, and in true right-angular relation with the base structure of the unit, by simply temporarily applying to certain of the posts a triangulated arrangement of connecting strips. In addition, it will be recognized that the provision of members with perforated sections, as herein disclosed, effects a substantial saving in labor, floor space, and other production costs, over the prior art production practices.

The invention, in general, therefore involves the provision of prefabricated interrelated, segmental or constituent parts, having portions provided with a certain arrangement of fastening device receiving apertures or perforations. The said parts are adapted to be cooperatively combined in accordance with a certain system or pattern so that their perforated portions can be selectively brought into overlapping relationship with one another to effect registry of determined perforations for insertion therein of temporary fastening devices or elements. The skeleton frame structure is assembled step by step in a certain systematic order which includes temporarily combining with the base structure, the various other constituent or segmental frame members of the unit, until the entire skeleton frame has been thus assembled. During or after this assembly procedure, the parts which have been temporarily connected, are permanently secured together by joints, as above indicated, and outer and inner surface panels are then added to the frame, as desired, or required in accordance with the construction specifications being followed.

Accordingly, all the constituents frame members or parts of the vehicle body unit are provided with an arrangement of apertures, substantially as indicated in the drawings. In some instances, these apertures are $\frac{7}{32}$ of an inch in diameter, in other instances they are $\frac{1}{32}$ of an inch in diameter. Likewise, two different appropriate sizes of temporary fastening elements are used during the assembly procedure, and the riveted joints indicated in the drawings are effected by rivets of the proper size to fit the particular apertures provided. In general, all the apertures are spaced apart a distance of two inches from center to center. However, it will be understood that the size of the apertures as well as the spacing thereof, may be varied, whenever this becomes necessary or desirable for purposes of strengthening certain joints, providing a greater or lesser amount of adjustability, or for similar practical and obvious reasons which will be readily apparent to those skilled in this art.

One type of temporary fastening element which has been found entirely satisfactory in connection with the actual practice of my invention, is shown in Figs. 25 to 34 inclusive. The construction and operation of this element is described in detail in Section IX, which more particularly sets forth the method of producing the vehicle body unit. Since Section IX also further clarifies the common purpose, function and result achieved by providing the various frame members with the apertures as clearly indicated throughout the drawings, for receiving either temporary or permanent fastening elements, specific reference to such apertures is not made in every instance when describing the separate frame structures, in order to avoid redundancy in the following detailed description of the same.

SECTION II

*The base frame structure*

In recent years, there has been a pronounced tendency toward the incorporation of standard high tensile steel members, instead of wooden members, in the frame of modern truck and trailer bodies. This tendency is mainly attributed to certain important advantages attained by the utilization of steel instead of wood in the manufacture of such frames. For example, the use of steel members makes it possible to standardize the frame construction details. This can be achieved with standardized prefabricated frame shapes and sections produced by economical mass production methods designed to simplify the body assembly. Frame designs in steel may also be held to more exact limits, since the physical properties of manufactured steel can be held to very close and uniform tolerances. Furthermore, steel body frame structures can be held to a much lower safety factor margin than when such structures are built of wood. Tests on runs of steels of the same make and grade show that there is rarely a difference in physical properties of more than five per cent. In comparison, lumber cut from the same log, may vary as much as 200 per cent, and in occasional instances its ability to act as a beam or strut for supporting a load varies to an even greater extent. These variations, in the case of wood, are due to the direction of the grain, the differences in the density of the fibers at different points thereof, and the presence of knots which distort the entire fiber structure in the immediate area of the knot. The present difficulties of obtaining properly seasoned lumber of dependable physical properties, also emphasizes the importance and advantages to be gained by utilizing metallic framing for truck and trailer bodies.

However, it has been found that the production of such metallic frame structures introduces certain problems which are characteristic of this particular type of frame construction. This will become more apparent when it is considered that the steel cross sills, utilized to form the base of such structures, are normally subjected to loads which greatly vary in magnitude under the different road and other conditions which prevail when a truck or trailer is in operation. For this reason, such sills must be either constructed of heavy gauge steel, which is undesirable because the weight thereof may be objectionable or prohibitive, or of lighter gauge steel, which in turn necessitates the application of special reinforcing means at certain locations, adapted to prevent such difficulties as buckling of the sills, whenever the load at said locations becomes excessive. Since the design and general characteristics of such special reinforcing means plays an important part in the type and design of the lighter weight cross sills which can be satisfactorily used in a frame structure of the indicated type, it will be realized that the provision of satisfactory means of this type, requires that certain practical and commercial considerations and problems be successfully overcome.

In modern truck and trailer body structures, certain base frame elements are arranged substantially as more clearly depicted in Fig. 7 of the drawings. The elements referred to are the longitudinally extending beams or sills 1 and 2, and the cross sills 3, a multiplicity of which are provided and arranged cross wise of the longitudinal sills 1 and 2. In an arrangement of this type, it has been found that when a truck or trailer body is put to work under operating loads, certain stress conditions prevail in the cross sills 3 which are accompanied by reacting forces, the nature and extent of which are fully explained in an article written by the inventor hereof and entitled "Steel Cross Sills and Mountings For Modern Steel Body Structures," which article appeared in the November 1, 1945, issue of the bi-monthly publication entitled "Automotive And Aviation Industries," a publication of the Chilton Publication Co. of Philadelphia. This article may be referred to for an understanding of the stress conditions and reacting forces prevailing in frame constructions and arrangements of the type here involved. It also provides more detailed information concerning the theory and practice of associating reinforcing or gusset devices with such structures, and makes clear certain problems of a practical and commercial nature which are solved by my invention in a better and more satisfactory manner than by the means heretofore available for this purpose.

In practice, it has been found desirable and advantageous to construct the longitudinal sills 1 and 2 of wood, instead of steel, in order that the cross sills 3 may rest upon a material that will better cushion or absorb the shocks and vibrations to which the sills are subjected. However, the use of longitudinal sills made entirely of wood presents two serious problems. First, steel cross sills 3, when bearing directly upon the wood will have a tendency to sink or wear into the wood when the truck or trailer is heavily loaded. After the load is removed, the cross sills can then reflect back into normal position, and this sometimes causes some of the cross sills to move out of contact with the longitudinally extending wooden sills at one point or another. Second, if the wood is not completely seasoned, it may shrink away from some of the cross sills 3, at certain points, and warp into closer contact with others. As a consequence of these conditions, certain of the cross sills 3 may carry more of the truck or trailer load than others, or will be twisted or bent when forced by the load, to move into contact with the longitudinal beams.

In order to retain the indicated cushioning or shock absorbing benefits derived when the beams 1 and 2 are made of wood, and at the same time avoid the referred to and other detrimental conditions directly traceable to longitudinal sills entirely of wood, steel capping or channel members 1$^a$ and 2$^a$ may be secured to the upper portions of the wooden beams 1 and 2, as shown in Figs. 4, 5, 6 and 7. These capping members function to spread or distribute the truck or trailer load uniformly along the beams 1 and 2, and in case of shrinkage or warping of the latter, at one point or another, will help to floatingly support the steel cross sills 3 over such affected areas of the beams.

When the cross sills 3, are subjected to certain load conditions, there is a tendency to cause buckling, sagging or bending thereof, as well as other difficulties. To overcome these tendencies and the detrimental effects thereto, I provide gusset or reinforcing devices of the type more clearly disclosed in Figs. 4 and 7.

In accordance with my invention, two types or forms, of such gusset devices are provided, and these are preferably made of metal, such as steel. One form of device is adapted along the right hand side of the base frame structure, and the other form of device is adapted to be applied to the left hand side of the base frame structure. Both forms of the device are substantially the same in construction, with the exception that one of the members of the device, in one instance, extends at an angle of 90 degrees in one direction from the main body portion of the device, and in the other instance, at an angle of 90 degrees in the opposite direction.

Referring now more particularly to the left hand form of gusset device, as shown in Figs. 4 and 7, this generally comprises a flat substantially square main body section 4, the lower part of which is provided with apertures through which may be extended elements 4$^b$, such as screws or bolts, adapted to secure the section 4 in sidewise relation to the longitudinally extending wooden beam 1. The upper part of the section 4 is arc welded to a downwardly extending flange section of the steel capping channel 1ª, along the edge locations. The gusset device is provided with an integral member 6, which extends laterally from the member 4 at an angle of 90 degrees. The member 6 is substantially triangular in configuration and provided with a top edge which is arc welded to the underside of the cross sill 3, along said entire edge. A continuous or integral top extension 7 projects beyond the upper part of the member 4, and this extension is also substantially triangular in configuration and is arc welded to the exterior surface of the vertical wall of the sill 3. One edge of the extension 7 terminates in a laterally bent reinforcing flange 7ª, and an edge of the member 6 similarly terminates in a laterally bent reinforcing flange 6ᵇ. To reduce the weight of the gusset device, suitable lightening apertures 8, 9 and 10 are provided centrally of the various parts thereof, as shown.

As previously indicated, the form of gusset device shown attached to the beam 1 in Figs. 4 and 7, is similar to the gusset device shown attached to the beam 2, but the latter device is shaped to function as a right hand gusset, and certain parts thereof consequently are oppositely arranged relative to the corresponding parts of the left hand gusset device already described. To avoid repetitive description, the same reference characters are consequently applied to the right hand gusset device, to indicate the parts thereof which correspond with the similar parts of the already described left hand gusset device.

From the foregoing, it will be apparent that when the right and left hand gusset devices are secured to truck or trailer frame elements, such as the beams 1 and 2 and cross sill 3, each of the gusset devices provides a two-way combination gusset element arranged which cooperates with the frame elements to which it is secured. Furthermore, the triangular portions 6 of the gusset devices, when welded to the bottom flange of the cross sill 3, will result in T-sections at their respective points of location, which prevent direct top loads and lower reacting forces from buckling the sill 3 at said locations. This arrangement of the gusset devices also provides the additional advantage of spreading the effect of the reactionary load forces out along the sill, for several inches towards both ends thereof, and away from the direction of origin of such forces. The extensions 7 of the gusset devices reach up on the web of the cross sill 3 and become an effective torsional brace for the latter. The welded assembly of the cross sill, the bearing channels 1ª and 2ª and the gusset devices, therefore provide a boxed-in corner effect which is most rigid at the point of greatest load reaction stress, and which gradually becomes more flexible and yielding as the reactionary forces are dissipated farther out in a wider spread area along the frame elements. In other words, this combination has a highly desirable uniform load cushioning or shock absorbing ability due to the fact that it ties frame elements, such as sills 3, down to wooden beams 1 and 2, in such manner as to distribute the loads evenly therealong.

Another feature of the gusset devices of my invention resides in the arrangement of the edges thereof which are adapted to be welded to the cross sills 3. In the technique of welding cross sills at or near load reaction points, it has been found that some high tensile steels lose a great share of their strength at the point of weld when subjected to welding heats. Therefore, welding across a section has a tendency to reduce its strength, substantially as when cutting across the section. Because of this, all weld lines should be parallel with the running lengths of the cross sill, or crosswise of the longitudinal sills 1ª and 2ª at their area of support on the bearing angles or channels, as accomplished when the gusset devices of my invention are welded to said cross sills, in the manner shown.

From the foregoing description of the base frame structure it will be apparent that this structure provides a particularly advantageous supporting means for the other parts of the vehicle body unit hereinafter described, but that the various salient features of this base structure may also be combined with other forms of body units to gain substantially the same or similar advantages.

The base frame improvements, described in this section, form the subject matter of my copending patent application Serial No. 670,786 which was filed May 18, 1946, now Patent No. 2,470,919, granted May 24, 1949.

SECTION III

*The wall post structure*

Figs. 6, 7, 8, 9 and 10 of the drawings disclose the various structural details of the wall post structure of the vehicle body unit.

The side wall posts are generally designated by the numeral 12, and consist of a separate upper segmental member 12ª and a separate lower segmental member 12ᵇ. The member 12ª is made of light gauge steel and the member 12ᵇ of relatively heavier gauge steel. Both members are shaped or formed so that the metal is distributed in greater volume where the greater stresses occur, the metal distribution also being carried out to avoid surplus metal from being present at the locations where it is not needed to carry the load.

The lower portion of the member 12ᵇ is flared or enlarged as indicated at 12ᶜ, to overcome the difficulties experienced at one of the most critical weak spots encountered in the prior art vehicle body constructions. This flared portion 12ᶜ provides a much greater spread between the weld fillets than can be obtained on a straight post of the type heretofore provided. The narrower tapered neck, or critical stress zone of the post, located directly above the portion 12ᶜ, is therefore positioned where the post first intersects the cross sill 3, at the point of connection with the latter, but is several inches removed therefrom or above this location. Accordingly, the said critical stress zone of the post is removed from the heat area when the portion 12ᶜ is welded to the sill 3, at the location shown in Fig. 8.

As more particularly shown in Fig. 6, wall posts are spacedly arranged along the opposite sides and along the front end of the body unit. The two section posts 12, which are arranged along the opposite sides of the body unit, are connected to the outer ends of the sills 3, by either rivets or welding, or both, as indicated in Fig. 8. The front wall posts 14 are made in one piece of steel and have a cross sectional configuration like the upper member 12ª of the side wall posts 12. The posts 14 are arranged along the front end of the body unit, and are welded or riveted to the flat side portion of the front end sill 3ª.

In the zone where the heavy welding occurs, that is, where the side wall post portion 12ᶜ is secured to the sill 3 in this manner, the effective depth of the post is made from 30 to 70 percent greater than it is throughout the remainder of the post section. Therefore, the stress per square inch of cross-sectional area is considerably reduced. The actual physical strength lost in the metal to the welding heat is more than compensated for by this reduction in stress requirement made possible by flaring out the post base 12ᶜ, as shown. This wider welding zone also increases the efficiency of the weld, and reduces the required inches of weld fillet as well as the weld heat necessary to obtain the desired strength of weld connection.

Although the wall post construction, as disclosed in the drawings, shows a roof structure associated with the upper ends of the posts, it is to be understood that this post arrangement is also especially suited for open top bodies, or any body where there is excessive side wall pressure, or side sway. This is so because the post base is particularly strong, and because the upper parts of the side wall posts 12 and front wall posts 14 are comparatively light, which minimizes the swaying stresses transmitted to the post base.

When the upper and lower members 12ᵃ and 12ᵇ are erected or assembled, the upper member 12ᵃ is left uncut. The lower member 12ᵇ is cut off at its top end to proper size, so that either 3 or 4 of the holes or apertures for receiving temporary fasteners, in the lower part of the member 12ᵃ, will overlap and register with the similar apertures of the upper end of the member 12ᵇ, and thereby give the post 12 the required height dimension.

The posts 12 and 14 are provided with depressions, as indicated at 12ᵈ of the posts 12 only. These depressions are located in the outer surfaces or faces of the posts 12 and 14 so as to receive or seat an outside horizontally extending belt line 36, hereinafter more fully described in Section IV. The purpose of the depressions 12ᵈ is to keep the outside face of the belt line 36 flush with the outside face of the post assembly. If desired, one or more additional depressions may, of course, be provided, either in the outside or inside face section of the posts, to similarly seat other parts.

As previously pointed out, the front wall posts 14 are made in one piece, whereas the upper and lower members 12ᵃ and 12ᵇ of the parts 12, are joined by first inserting temporary fastening elements through the aligned apertures of their overlapping portions, and then welding or riveting the two members together.

It will be noted from Fig. 8, that apertures are provided in the flange sections of the lower post member 12ᵇ, for later attachment thereto of parts, such as an outside rub rail and an inside base rail, which parts are described in Sections V and VI. It will also be noted that the arrangement of the cooperating parts at the lower end of the post 12 is such that all the apertures for the fastening elements are easily accessible, and that plenty of clearance exists at each assembly point to facilitate the assembly procedure.

SECTION IV

*The inner and outer belt line structure*

Figs. 5, 6, 7, 8, 12 and 13 of the drawings disclose the various structural details of one arrangement of inner and outer belt line structure for the vehicle body unit.

The outside belt line consists of a plain flat strip 36, of metal or other suitable material, which is ⅛ inch thick, 1¼ inches wide, and is provided with 3/32 inch apertures the centers of which are spaced 2 inches apart. A heavier strip can obviously be utilized, if desired. The strip 36 is mounted as shown more particularly in Figs. 7, 8, 12 and 13, about midway between the top and bottom of the vehicle body unit, along the outside of the side and front end wall frames thereof. The side wall posts 12, and the front wall posts 14, are provided with indentations or recesses 12ᵈ at certain locations, in which the strip 36 is seated and secured so as to bring the outside surfaces of the strip 36 flush with the outside surfaces of the post assembly. The posts 14, which are spacedly secured to a front end cross sill 3ᵃ, are provided with similar depressions 12ᵈ, but the latter are not specifically shown, since this arrangement will be clear from the disclosure thereof in the posts 12.

The strips 36 can also be used for other purposes in connection with the vehicle body unit assembly. For example, as indicated in descriptive Section I, the side and front end wall posts can be brought into exact vertical parallelism with respect to each other, by temporarily applying certain lengths of such strips 36 to the posts in a triangulated arrangement. This will assure that the wall posts are in true right-angular relation to the base structure, and that the body side, end and door assemblies are in properly squared relationship. Since the arrangement of the apertures of the various frame sections of the vehicle body unit is uniform and the apertures are all spaced apart a distance of 2 inches from center to center, or in even multiples of such spacing, the following procedure can be followed to effect that said alignment of frame parts or sections:

Using the 2 inch space as a unit, right angles may be set up with the strips 36 at any intersection of the frame members, such as the posts 12, by using the principle that any multiple of the units 3 and 4 and 5 will determine the two sides and hypotenuse of a right angled triangle. Therefore, starting at an intersection of a post 12 with the outside belt line, i. e., where the strip 36 is normally applied as shown in the drawings, and counting off 18 post apertures above the strip 36, this spacing can be considered as the short side of a triangle. Dividing this number of apertures (18) by 3 will give as a result the number 6. Consequently, the three sides of this particular determining triangle would be 6×3 or 18, and 6×4 or 24, and 6×5 or 30. Utilizing three sections of the belt line strip 36 for squaring up a frame assembly involving the posts 12, eighteen spaces would be used between the belt line strip 36, as the point on the vertical leg which represents the apex of the squaring triangle. Counting off 24 aperture spaces on the belt strip 36, in either direction from the post, will locate the point at which one end of the diagonal strip is to be attached. Next counting off 30 spaces on the diagonal strip will locate the point of connection of the other end of the diagonal strip with the particular post aperture originally decided upon to represent the upper apex of the triangle. By using this same general method for inserting several of these temporary triangulated strip arrangements at various points in the frame structure, the entire skeleton frame arrangement can be rapidly squared up prior to the welding operations. After welding of the joints, the squaring strips are removed so that the paneling of the vehicle body unit may be properly applied.

An inside belt line strip 37 is also applied to the side and front wall posts, as shown in Figs. 8, 12, and 13. The inside belt line 37 is attached to the said wall posts in opposed relation with the outside belt line 36. The inside belt line strips 37 art practice, but has resulted in the attainment of a much stronger, better built, as well as neater appearing, roof setup or arrangement.

In accordance with one procedure, the roof structure of my invention is built up as a complete unit, at waist height off the floor, on a bench or saw horse platform where it is easy to work and perform all the necessary operations. The final bolting of the roof into place on the body can be performed without the necessity of working in awkward positions on a scaffold.

The parts of the roof structure are few, and simple to use. They consist of carline or roof girder sections 47, carline splice elements 48, roof cap members 49, corner cap members 50, and plain flat metal strips of the type used for the outside belt line, which strips have previously been identified by the numeral 36. Added to these are flat sheet metal panels of the type which can be purchased from any local warehouse or supply source, and which are adapted to cover the straight surface area at the top of the roof structure.

In accordance with one practical procedure, the roof structure may be made up as a unit, in the following manner:

The first step taken in building up the roof assembly is to determine the length and width of the roof structure to be built. The inside length of a curved or rounded corner roof structure must be 11½ inches plus any multiple of 2 inches increments on a steel to steel dimension inside the posts. The inside length of the same arrangement, except with square rear end corners, must be 9¼ inches plus any multiple of 2 inch increments on a steel to steel dimension inside the posts. For a net inside length dimension the thickness of any lining material should be subtracted from the steel to steel dimensions. The inside gross width of either the round or square cornered arrangement will equal 1½ inches plus any multiple of two inches, and can be reduced to an odd inch by cutting an extra inch off one side of the structure and setting the center of the cross sills 3, ½ inch off the center of the chassis frame.

The roof structure may be proceeded with by first cutting the carline segments 47 to the proper length so as to give the proper length to the carline units for the finished assembly. Next, oppositely arranged carline segments 47 are assembled with the carline splice elements 48, by inserting temporary fasteners in the registering or aligned apertures of the overlapping portions of the parts, when cooperatively positioned as shown in Figs. 21 and 22. The carline segments 47 and splice segments 48 which have been so united, are then welded together, and the temporary fasteners removed therefrom. The completed carlines so formed, are then set along the lintel frame fixture at the spacing desired, and the two large apertures in each carline shoe member 47a are then brought into registry with two smaller but corresponding apertures in the respective lintels of the lintel frame fixture, on which the shoe members 47a rest. The respective carlines are then bolted to the lintel frame by means of temporary fasteners or bolts. A shoulder washer should ordinarily be used to hold the holes or apertures in the carline shoes 47a concentric with the smaller apertures in the lintel members of the lintel frame fixture. The said two connecting apertures in the carline shoes are made oversize to allow for a slight drifting of the complete roof assembly when it is later assembled with the body structure, and to compensate for any expansion or shrinkage or warpage of the metal parts due to the welding operations. At the time the carlines are first assembled with the lintels, the two connecting apertures in the carline shoes 47a, and the smaller connecting apertures in the lintel frame fixture, should be held absolutely concentric with respect to each other, by means of the said shouldered washers. If desired, or preferred, an even larger hole clearance may be provided by providing apertures in the carline shoes 47a which are large enough to accommodate a $\frac{5}{16}$ inch lock washer. Such a lock washer may be snapped into the apertures to serve as a spacer, adapted to hold the carline shoe apertures and the lintel holes concentric during their initial assembly. In connection with the lock washers, short $\frac{5}{16}$ inch bolts may be used for the assembly of this detail, in place of the regular temporary fastening elements disclosed in Figs. 25 to 34 on the drawings.

After the carlines are in proper place, roof cap sections 49 are next placed over the carlines and lintel frame structure and attached by means of temporary fastening elements. Before inserting the temporary fastening elements in the holes or apertures of the roof cap members 49, a ⅛ inch spacer should be placed between this line of apertures and the outside lower flange of the lintel frame fixture. A metal strip of the type which also serves as an outside body belt line member, such as designated by the numeral 36, will serve very well as the spacer means for the purpose indicated. By arranging the spacer means in the manner indicated, the roof structure will be made slightly oversize, and this is desirable in that it will effect easier final assembly of the roof structure on the body wall. The bottom tail piece 49a on the straight roof cap members 49, will spring in far enough to make a tightly fitted up joint after the said spacer elements have been removed.

With the roof cap members 49 and carlines 47 in position, the corner caps 50 should now be welded into place, in the relationship shown in Fig. 14. When square rear corners are formed on the body, the caps 50 are not used, but instead, the straight roof cap members 49 are simply mitered and brought together at a square mitre joint.

A center line strip 51 is next welded into place as shown in Figs. 14 and 21. The strip 51 may also be of the type previously described as forming the outside belt line of the body member, identified by the numeral 36 in Figs. 8, 12 and 13. When welding on the said center strip 51, care should be taken that none of the apertures provided in this strip come directly over the top flange of the carline splice elements 48. Otherwise, there will not be sufficient clearance under the job to complete the riveting operation required when the flat roof panels which finally cover this roof shell are riveted into place.

Before assembling or attaching flat roof panel sheets of metal, or other material, to the roof frame structure as shown in Fig. 14, the welding up of the various parts of the roof frame structure is effected, and all temporary fasteners are removed from these parts and the lintel frame fixture. Then, before laying on the roof sheets, a metal sealer, such as "Alumilastic Universal" grade metal sealer, should be applied around all the top-inside edges of the roof cap are provided with apertures 38 of about 1⅜ inches in diameter, on two inch centers, arranged in axial alignment with the smaller apertures of the outside belt line strip 36. Accordingly, after both the belt lines 36 and 37 have been secured to the wall posts as shown, the 1⅜ flanged apertures of the inside belt line 37 will be directly opposite and concentric with the 3/32 inch apertures of the outside belt line 36. This will permit riveting of panels or bolting on of mouldings after the inside plywood or other type upper and lower panels 39 and 40 have been secured in position as shown in Figs. 12 and 13. This feature is particularly important and advantageous in that it avoids the necessity of removing the inside body paneling in connection with a repair or other operation to be performed on the outer upper or lower metallic or other type panels, indicated at 41 and 42 in Figs. 12 and 13.

To steady or reinforce the inside and outside belt lines 36 and 37, at their locations between the wall posts, spacing elements or brackets 43 may be secured thereto in connecting relation, as clearly shown in Figs. 12 and 13. The elements 43 will also help to prevent the outside belt line 36 from becoming loose or wavy, after its attachment to the wall posts. One or more of the elements 43 may be secured in position in the zone between the posts to effect stiffening of the belt lines 36 and 37, or to hold the latter in alignment.

It will be noted that the belt line construction in accordance with my invention, adds the particularly advantageous feature to the vehicle body unit of allowing the post sections to continue unbroken or uninterrupted from the base of the body unit to the roof thereof. The belt lines also continue uninterruptedly throughout the length and width of the job as a built up and well rigidized truss member interwoven with the wall post members.

Section V

The base rail structure

Figs. 7 and 8 more particularly disclose the structural details and location of the base rail structure.

The base rail, indicated by the numeral 44, is mounted on the inside of the vehicle body unit at the junction of the side and front wall posts, and the cross sills of the base structure. The base rail performs several important functions. First, it gives additional strength to the posts at their bottom end location, where this added strength is desirable. Next, it provides a base rest for the edge of the flooring and an attaching means for holding the flooring in place. However, the most important function performed by the base rail is, that of providing protection to the inside plywood or other type paneling 40, near the bottom of the side and front walls, where this paneling functions as a lining.

It has heretofore been found in practice that at this location, the inside lining of a vehicle body unit is most frequently damaged and requires replacement. In those instances of the prior art arrangements where plywood paneling extends to the floor, it has been found that two conditions exist which cause rapid disintegration of the plywood lining near the floor line. On rainy days, when loading is done at the rear of the body unit, floor water can get at the end grain edges of any plywood lining which extends all the way to the body floor. Water that enters at the edge of a piece of plywood where the end grain is exposed can work its way up several inches into the panel by capillary action and thus expand and soften the panel. Another hazard is caused by wooden packing boxes and crates which usually have outstanding cleats. When these boxes or crates are loaded over the floor, the impact of the box cleats with the section of the plywood panel near the floor tends to rupture the plywood. Such conditions make it more or less frequently necessary to replace the plywood lining. These and other difficulties are overcome by providing a base rail 44, as shown.

The upper edge of base rail 44 is shaped so as to receive the lower edge of the inside plywood panels 40, at a point above the floor where the water cannot get at the edge grain. It will also be observed that the upper edge section of the base rail 44 is so shaped that an offset part thereof projects somewhat beyond the outside surface of the bottom edge of the plywood lining 40. This arrangement prevents a large share of the impact forces of box cleats and similar objects from taking its full destructive effect upon the plywood panel lining.

The base rail 44 is welded to the side and front wall posts, as illustrated. At the front corners of the vehicle body unit, where the corner posts are curved, the straight side and front sections of the base rail 44 are joined squarely into the corner of the body in a mitre joint within the radius of the outside corner cover. Plywood or other lining is attached to the top segment of the base rails by use of self tapping hardened metal screws or bolts.

Section VI

The rub rail structure

Figs. 7 and 8 more particularly disclose the structural details of the rub rail structure of the vehicle body unit.

The rub rail 45 is secured to the lower ends of the wall posts, at the outside thereof, after the body unit is otherwise completed and all the panels are in place. It may be bolted or riveted on at the location shown in the drawings, so that it extends along the bottom of the side and front walls and protects the lower outside portions of these walls against damage from the side-swiping action of other vehicles, or any bumping or rubbing to which these wall portions are ordinarily exposed or subjected.

The rub rail 45 may be reinforced by welding a separate channel member 46 to the inside of the rub rail so it may bear against the lower outside end of the wall posts, so that the channel member 46 is positioned on the inside of the curved portion of the rub rail 45, as clearly shown in Fig. 7. This channel member 46 will prevent the curved portion of the rub rail 45 from collapsing, in the event that the said curved portion is subjected to an unusually heavy blow or crushing force.

Section VII

The roof structure

Figs. 1, 2, 3, 5, 7, 14, 15, 16, 17, 18, 19, 20, 21, 22, 23 and 24 show various details of the roof structure of the vehicle.

One of the most difficult problems which has heretofore confronted manufacturers of vehicle body units, was the problem of providing such units with a satisfactory all metal roof. The solution of this problem, as solved by the roof structure of my invention, has not only simplified the former time-consuming task of providing such a structure in accordance with the prior sections 49. The roof panels should then be applied in two pieces running longitudinally across the open space at the top of the roof structure and riveted into position through the holes at the edges of the roof cap members 49 and down the center longitudinal strip 51. The panels should lap over each other at the center joint, and a layer or coating of the said metallic sealing cement spread in this joint. The riveting holes are drilled in the roof panel sheets by using the holes already provided in the other roof elements or members, as drilling guides.

SECTION VIII

*The surface panel structure*

The roof frame structure is covered at its top by two lengthwise extending metallic panel sheets 52 and 53, which overlap each other directly above the strip 51. At this point, the overlapping edges of the panels 52 and 53 are secured to the strip 51 by rivets, or standard metal screws of the type used to connect paneling or other parts to automobile bodies. Along their outer free edges, the panels 52 and 53 are similarly secured to the roof cap members 49 and cover cap member 50.

The inside of the roof structure may, if desired, be covered with lengthwise extending plywood or other panel sheets, as indicated at 54 in Fig. 15. These panels are arranged in continuous contacting edge to edge relationship, so as to evenly cover the area between the lintels 15 and 17 located at the upper ends of the wall posts. The panels 54 are secured to the lower flanges of the roof girders or carline segments 47, by bolts or metal screws. They are also secured in the same manner around the outside edges by attaching the edges of panel 54 to another strip of belt line member S. This construction allows for later removal of the roof from the lower body, in case maintenance or repairs are required, without the necessity of removing the fasteners holding the ceiling panel 54 in place.

SECTION IX

*The method of producing the vehicle body unit*

From Sections I to VIII inclusive, it will be clear that vehicle body units, in accordance with my invention, may be partly or entirely constructed of prefabricated, correlated, standardized, body elements, members, or sections, arranged to be cooperatively combined in a certain manner; that these body elements, members, or sections, are provided with portions adapted to be brought into overlapping, or interfitting relationship with one another; and that the said portions are provided with apertures, or holes, arranged in a certain systematic synchronized order to enable ready alignment thereof during the vehicle body unit erecting procedure, and insertion therethrough of either temporary or permanent fastening elements.

Such vehicle body units, and certain of the component parts thereof, are adapted to be constructed or erected, by first temporarily connecting the constituent parts thereof, and then permanently connecting the same. The particular order of combining the parts, may, or may not be, the same in every instance, so that the manufacturing method, or procedure of producing the vehicle body units, can be made to conform with the practices considered best, and the facilities available, at the factory or shop where the vehicle body units are produced. This flexibility, or versatility, of the manufacturing method here involved, is particularly important and advantageous, for several reasons. It enables the adoption of a step-by-step procedure considered to be most desirable and practical from the standpoint of the individual manufacturer. It also permits the manufacturer to readily satisfy special requests made by purchasers of the vehicle body units with respect to such items as the length, width and height of the unit, the size and location of a side door, the interior or exterior finish of the unit, the inclusion or exclusion of a roof structure, liner slats, or other parts, etc.

It will be understood, therefore, that while my method of manufacturing the vehicle body units is predicated upon a certain underlying principle of procedure, the order of the procedural steps may be varied to suit the circumstances prevailing at the place where the units are made. The description of one method of producing a practical vehicle body unit in accordance with my invention, will therefore serve to illustrate, or exemplify, the manner in which such vehicle body units in general, are produced.

In actual practice, it has been found that certain steps in the method of constructing the vehicle body units can be most expeditiously carried out by using more or less special temporary fastening devices, or clamps, which are adapted to be quickly and easily applied to, and removed from, the parts to be temporarily connected together. These devices, and a tool for manipulating them, are illustrated in Figs. 29 to 34 of the drawings. These devices and the tool for operating them, are not fundamentally new. However, the particular embodiment, or construction thereof shown in said figures, differs in certain respects from the similar devices heretofore used for other purposes, so that a disclosure and description of the devices, as designed and adapted for use with my invention, will clear up any questions concerning their use as a practical means for accomplishing certain results in the present instance.

The temporary fastening device, shown in Figs. 29 to 32, is generally designated by the numeral 55, and comprises a hollow body part 56, a compression spring 57, two laterally movable elements 58 and 59, a tail piece 60, and two members 61 and 62. The member 61 functions as a wedge and retains the rear ends of the elements 58 and 59 spread and anchored in the tail piece 60. The member 62 is stationarily held in the body part 56 between the front end of the spring 57 and the front wall of the body part 56. From Fig. 31 it will be noted that the member 61 is provided with two lateral projections 61ª, arranged to be stationarily seated in the tail piece 60 as shown in Fig. 29. From Fig. 32 it will be noted that the member 62 is similarly provided with two lateral projections 62ª adapted to be stationarily seated in the front end of the body part 56. The front ends of the elements 58 and 59 are provided with lateral projections or jaws 58ª and 59ª, arranged to rest against the outer surface of the front wall of the body member 56 when the device 55 is in normal or inactive condition.

The gun-type tool 63 is provided at its front end with a retractible slide member 64 on which a device 55 may be mounted, as shown in Figs. 33 and 34. When the trigger 65 of the tool 63 is moved rearwardly, the slide member 64 will also be moved rearwardly, and this will compress the device 55 in the manner shown in Fig. 27. This compressing action will force the body member 56 and element 62, of the device 55, to be moved in unison toward the tail piece 60, against the action of compression spring 57, so that the jaws 58ª and 59ª will be free to move toward each other to the fullest extent. The forward end of the device 55 will then be narrowed so that it can be readily moved through the adjacent apertures of two frame member portions A and B, until the front end of the body member 56 abuts the frame member A. Release of the tool trigger 65, will then cause the elements 58 and 59 to move rearwardly, and simultaneously away from each other due to the projection therebetween of the element 62, until the jaws 58ª and 59ª are expanded and locked against the frame member B, as shown in Fig. 28. The tool 63 can then be released from the device 55. To remove the device 55 from locking engagement with the frame members A and B, it is merely necessary to again apply the tool 63 to the device 55, move the trigger 65 rearwardly, until the jaws 58ª and 59ª of the device are in their collapsed position shown in Fig. 27, and then withdraw the device from the frame members A and B.

The devices 55 can be rapidly applied to, and removed from, the vehicle body frame members, in the manner described, and this results in saving a great deal of time over the prior art method of temporarily uniting frame members by means of nuts and bolts, or other similar standard devices. When the devices 55 are positioned at a point on the frame arrangement which is to be welded, care must be exercised to always insert the clamp on the side of the joint opposite to where the welding flame is directed and then promptly removing the clamp after the first welding tack is made, in order that the temper of the spring 57 of the clamp may not be drawn by excessive heating. In cases where it is absolutely necessary to weld close to the assembly apertures in which a device 55 is positioned, it is best to first apply a conventional quick acting jaw-type clamp over the joint and then remove the device 55 before starting the welding. Experience in carrying out such operations will soon teach the best solution for each type of joint detail.

The devices 55 are provided in two sizes, so as to fit the two different sizes of assembly holes or apertures provided in the frame sections of the vehicle body unit. The size of device 55 most frequently used is provided with clamp elements 58 and 59 adapted to be inserted in apertures having a diameter of 7/32 inch. The larger device 55 is provided with clamp elements 58 and 59 adapted to be inserted in apertures having a diameter of 11/32 inch. The larger apertures are provided in the heavier frame parts, such as the base frame parts of the body unit structure, and may also be used with an upset shoulder washer in connection with the initial assembly of the carline segments 47 on the lintels 15 or 17, as indicated in the description of the roof structure.

It has been found in practice that a good start can be made in the production of my improved vehicle body unit, by first erecting or assembling the roof structure. The general method followed in producing the roof structure, is described in Section VII hereof. Briefly, it comprises the formation of a rectangular roof structure fixture by uniting four lintel sections of the type designated by the numerals 15 or 17 in the drawings, with four corner plates 19 or 26, depending upon whether the vehicle body is to be provided with a curved or a square type corner arrangement. The lintels are cut to proper length, so that, after they are united with the said corner plates, the length and width dimensions of the completed rectangular frame will fit the side wall structure and roof structure to be erected. The lintel sections are connected or united with the corner plates by tie members of the type designated by the numeral 20 in the drawings. The various parts comprising the rectangular frame are first united with each other by means of the temporary fastening elements 55.

Using the frame just described as a fixture, the various parts comprising the roof structure may next be erected. This is accomplished by bringing into opposed aligned relationship as many pairs of roof carline sections 47, as are required to provide the roof structure with the desired number of roof carlines, and then uniting the said pairs of carline sections by attaching thereto in intermediate relationship the connecting splices 48. The said connecting splices 48 are so located and positioned that each particular roof girder will be of the proper length, and so that certain of the apertures of the overlapping portions of the centrally positioned connecting splice 48 and the inner ends of the carline sections 47 come into registry with an another. Temporary fastening elements 55 are then secured in the apertures which have been aligned, thereby temporarily uniting the cooperating parts of the respective roof girders. The parts just described are then welded together and the temporary fastener elements 55 removed. The shoes 47ª of the roof girders so formed are then spacedly attached by temporary fastening elements 55 to the lintels of the roof structure fixture, with shoulder washers inserted to hold the 17/32 holes in the carline shoes 47ª concentric with the 11/32 inch diameter holes in the lintels. After the carlines are in place, the side and end roof cap sections 49 are next placed over the carlines and lintels and attached by means of temporary fasteners 55. Before inserting the devices 55 in the low row of 7/32 inch holes of the roof cap, an eighth inch spacer strip S should be placed between this line of holes and the outside lower flange of the lintel. A strip of the outside belt line type designated 36 in the drawings, will serve very well as this spacer. This spacer insures the roof being slightly oversized on the body will and allows for an easier final assembly. The bottom tail piece on the roof cap sections 49 can later be sprung in far enough and tightened against the upper ends of the side walls of the body unit to make a tight fitting joint after the said spacer is removed at the final assembly. Where the roof structure requires corner roof caps 50, these are next welded into place and joined with the roof cap sections 49. At square corners, the corner caps 50 are not used. Where square corners are to be formed, the roof cap sections 49 are simply mitered at their ends and brought together in a square joint.

Next the center line strip 51 is welded into place as shown in Fig. 14.

If desired, short longitudinally extending reinforcing members 60 may be welded between the end girders, as shown in Fig. 14.

Before the roof panels are attached, the welding up of all the other parts of the roof structure frame is completed. The devices 55 are then removed and the roof structure frame is detached from the fixture frame. Before laying on the metal roof panel sheets a bed of "Alumilastic Universal" grade metal sealer is applied around all the top edges of the roof cap sections 49 and corner roof caps 50. The roof panels are then applied in two pieces running longitudinally across the open space at the top of the roof structure and riveted into position through the holes at the edge of the roof cap sections 49 and down the center longitudinal strip 51. The panels 52 and 53 should lap over each other at the center joint and a layer of "Alumilastic" metallic cement spread on in this joint. The riveting holes are drilled in the roof panel sheets 52 and 53 by using the holes already provided in the other roof sections as drilling guides.

The erection of the vehicle body unit may be proceeded with by next producing the base structure. Thereafter may be added the wall structure, including all the parts desired to be incorporated therein, such as a rear door arrangement, a side door, inner and outer belt lines, a base rail, rub rail, liner slats, and the inner and outer wall panels.

The erection of the base structure is started by placing two wooden base beams 1 and 2, of proper length, on the floor, in determined spaced parallel relationship. The cap channels 1ᵃ and 2ᵃ may be initially combined with the beams 1 and 2, or are next mounted on the beams 1 and 2, and the cross sills 3 and 3ᵃ are then arranged in transversely extending order upon the channels 1ᵃ and 2ᵃ, in accordance with the spacing arrangement determined upon. The location of the cross sills is usually determined by certain fixed dimensions, such as the spacing of the front wall of the vehicle body unit from the rear wall of the cab of the truck, the location and size of the rear wheels of the truck, and the location of the rear end wall of the body unit. The front wall of the vehicle body unit is usually spaced about four inches from the rear wall of the truck cab. The size and location of the rear truck wheels determine the distance between the two cross sills 3 directly adjacent the front and rear of these wheels, and the location of the rear end wall of the vehicle body unit, of course, depends upon the length of the latter. Having determined upon the proper spacing of the cross sills 3, and whether the end cross sills are to be of the same type as the intermediate sills 3, or the type 3ᵃ, the sills are then placed in proper location and secured to the longitudinal beams 1 and 2 in the manner explained in section II.

The erection of the side wall posts 12, the front wall posts 14, and the corner post structure, may next be proceeded with by first temporarily attaching certain of their respective parts, to the ends and other mounting locations of the base cross sills, with the devices 55. The wall posts are positioned in parallel relationship with one another, and in right angular relationship with the base cross sills, by utilizing metal strips, such as those identified by the numeral 36, and tying the posts together in conection with the triangulation procedure explained in section IV.

The wall posts and base cross sills are then welded together at their connecting locations, and the devices 55 removed. The rear door structure, and a side door structure if desired, may then be added by first utilizing the temporary fasteners 55 to mount the door frames, and then permanently securing these frames to their respective wall posts by welded joints. At about this time, the frame fixture previously provided for erecting the roof structure, can then be applied to the upper ends of the wall posts, and permanently secured in place.

The outer and inner belt lines 36 and 37, are applied in accordance with the description of Section IV; and the base rail structure, the rub rail structure, and the floor threshold structure, as explained in Sections V and VI.

The roof structure is finally secured in position at the top of the wall structure.

Section X

Concerning modifications

In view of the numerous possibilities here involved of providing a vehicle body unit in one form or another, it will be realized that many construction and method variations may be practiced, all of which will, however, come within the purview of my invention. For example, a body unit may be provided without a roof, and instead of providing surface panels on the inside of the body, conventional steel liner slats, as shown at 67 in Fig. 11, may be welded in relatively spaced, parallel longitudinal order to the inner surfaces of the body wall posts. If desired, such parts as the rub rail 45 may be omitted, or a rub rail of different configuration substituted. Some of the features herein disclosed, may be added to, or combined with, prior art vehicle body structures, so as to add to the latter certain features only of my invention.

Instead of providing the roof structure in the form of a sub-assembly unit, as described in Section VII, the roof girder units comprising two roof carline sections 47 and a connecting plate 48, may be attached, one after the other, to the top of a completed body frame skeleton. That is, the body frame can be first completed to the point where all the other frame members have been assembled and united, including the provision at the top of the wall posts of a roof fixture frame as described in Section VII. The said roof girders can then be added, and the roof structure built up, directly over, or on, the completed body frame structure, in the step-by-step order described in Section VII.

Other changes and modifications may be carried out in connection with the practice of my invention, in order that a completed vehicle body unit will embody standard structural features, as well as elements, parts and arrangements, not specifically referred to herein, but obvious from this disclosure to those skilled in the art to which the invention relates.

It will be understood, therefore, that the improvements as herein specifically disclosed, can, of course, be changed and modified in many ways, without departing from the invention, the scope of which is more particularly indicated by the hereto appended claims.

I claim:

1. A roof girder for a vehicle body unit of the character described, comprising separate outer members of substantially U-shaped cross-section having a curved end wall section, and a girder length-adjusting member of substantially U-shaped cross-section joined with the inner portions of the outer members in aligned overlapping relationship which member is provided with a depression in one wall thereof arranged to form a seat for a roof girder connecting strip.

2. A skeleton metal body frame structure for a commercial vehicle; comprising a base frame including a plurality of cross sills; a side wall frame structure including vertically disposed pairs of opposed posts the lower sections of which are secured to the outer ends of the cross sills; a roof frame unit secured to the upper ends of the posts; and a belt line structure including two belt line strips which are respectively secured to the inside and outside of the posts so that they extend transversely thereof at the same vertical location, the outside strip being provided with apertures for receiving fastening elements and the inner strip being provided with apertures for insertion therethrough of a tool adapted to be used in conjunction with the fastening elements.

NELSON E. COLE.

REFERENCES CITED

The following references are of record in the file of this patent:

UNITED STATES PATENTS

| Number | Name | Date |
|---|---|---|
| 404,276 | Green et al. | May 28, 1889 |
| 809,920 | Kiesel, Jr. | Jan. 9, 1906 |
| 1,061,547 | Kennedy et al. | May 13, 1913 |
| 1,263,298 | Weber | Apr. 16, 1918 |
| 1,312,422 | Norton | Aug. 5, 1919 |
| 1,621,675 | Masury | Mar. 22, 1927 |
| 1,674,394 | Hansen | June 19, 1928 |
| 1,679,642 | Walden | Aug. 7, 1928 |
| 1,710,252 | Ziegler | Apr. 23, 1929 |
| 1,877,653 | Fageol | Sept. 13, 1932 |
| 1,883,991 | Ledwinka | Oct. 25, 1932 |
| 1,953,991 | Schjolin | Apr. 10, 1934 |
| 2,029,756 | Davis, Jr. | Feb. 4, 1936 |
| 2,163,748 | Dayes | June 27, 1939 |
| 2,172,571 | Theriault | Sept. 12, 1939 |
| 2,199,886 | Luce | May 7, 1940 |
| 2,239,089 | Fageol | Apr. 22, 1941 |
| 2,263,510 | Lindsay | Nov. 18, 1941 |
| 2,330,182 | Theriault | Sept. 21, 1943 |
| 2,330,819 | Faure et al. | Oct. 5, 1943 |
| 2,335,328 | Whitehead | Nov. 30, 1943 |
| 2,400,150 | Jones et al. | May 14, 1946 |
| 2,489,670 | Powell, Jr. | Nov. 29, 1949 |

FOREIGN PATENTS

| Number | Country | Date |
|---|---|---|
| 119,557 | Austria | Oct. 25, 1930 |
| 120,407 | Switzerland | May 16, 1927 |
| 367,691 | Great Britain | Feb. 25, 1932 |
| 422,642 | Great Britain | Jan. 16, 1935 |